US008549846B2

(12) United States Patent
Gonze et al.

(10) Patent No.: US 8,549,846 B2
(45) Date of Patent: Oct. 8, 2013

(54) DIESEL PARTICULATE FILTER REGENERATION VIA RESISTIVE SURFACE HEATING

(75) Inventors: Eugene V. Gonze, Pinckney, MI (US); Frank Ament, Troy, MI (US)

(73) Assignee: GM Global Technology Operations LLC

( * ) Notice: Subject to any disclaimer, the term of this patent is extended or adjusted under 35 U.S.C. 154(b) by 1350 days.

(21) Appl. No.: 11/557,715

(22) Filed: Nov. 8, 2006

(65) Prior Publication Data

US 2007/0220869 A1    Sep. 27, 2007

(51) Int. Cl.
*F01N 3/00*    (2006.01)

(52) U.S. Cl.
USPC .............. 60/297; 60/300; 60/303; 60/295

(58) Field of Classification Search
USPC .......... 60/274, 297, 300, 303, 311; 55/282.2, 55/283, 466, DIG. 10, DIG. 30
See application file for complete search history.

(56) References Cited

U.S. PATENT DOCUMENTS

| 4,450,682 | A | * | 5/1984 | Sato et al. ................ 60/286 |
| 4,505,726 | A | * | 3/1985 | Takeuchi et al. ........... 55/282 |
| 4,516,993 | A | * | 5/1985 | Takeuchi et al. ........... 55/283 |
| 4,535,589 | A | * | 8/1985 | Yoshida et al. ............ 60/303 |
| 4,558,565 | A | * | 12/1985 | Kojima et al. ............. 60/286 |
| 4,851,015 | A | * | 7/1989 | Wagner et al. ............. 95/15 |
| 5,277,937 | A | * | 1/1994 | Bagley et al. ............. 427/553 |
| 5,423,904 | A | * | 6/1995 | Dasgupta ................ 96/146 |
| 5,780,811 | A | * | 7/1998 | Kawamura .............. 219/205 |

OTHER PUBLICATIONS

U.S. Appl. No. 11/233,450, filed Sep. 22, 2005.

* cited by examiner

*Primary Examiner* — Thomas Denion
*Assistant Examiner* — Patrick Maines

(57) ABSTRACT

An exhaust system that processes exhaust generated by an engine is provided. The system includes: a particulate filter (PF) that filters particulates from the exhaust wherein an upstream end of the PF receives exhaust from the engine; and a grid of electrically resistive material that is applied to an exterior upstream surface of the PF and that selectively heats exhaust passing through the grid to initiate combustion of particulates within the PF.

12 Claims, 5 Drawing Sheets

US 8,549,846 B2

DIESEL PARTICULATE FILTER REGENERATION VIA RESISTIVE SURFACE HEATING

STATEMENT OF GOVERNMENT RIGHTS

Certain of the subject matter of the present application was developed under Contract Number DE-FC-04-03AL67635 awarded by the Department of Energy. The U.S. government has certain rights in this invention.

CROSS-REFERENCE TO RELATED APPLICATIONS

This application claims the benefit of U.S. Provisional Application No. 60/786,059, filed on Mar. 24, 2006. The disclosure of the above application is incorporated herein by reference.

FIELD

The present disclosure relates to methods and systems for heating particulate filters.

BACKGROUND

The statements in this section merely provide background information related to the present disclosure and may not constitute prior art.

Diesel engines typically have higher efficiency than gasoline engines due to an increased compression ratio and a higher energy density of diesel fuel. A diesel combustion cycle produces particulates that are typically filtered from diesel exhaust gas by a particulate filter (PF) that is disposed in the exhaust stream. Over time, the PF becomes full and the trapped diesel particulates must be removed. During regeneration, the diesel particulates are burned within the PF.

Conventional regeneration methods inject fuel into the exhaust stream after the main combustion event. The post-combustion injected fuel is combusted over one or more catalysts placed in the exhaust stream. The heat released during the fuel combustion on the catalysts increases the exhaust temperature, which burns the trapped soot particles in the PF. This approach, however, can result in higher temperature excursions than desired, which can be detrimental to exhaust system components including the PF.

SUMMARY

Accordingly, an exhaust system that processes exhaust generated by an engine is provided. The system includes: a particulate filter (PF) that filters particulates from the exhaust wherein an upstream end of the PF receives exhaust from the engine; and a grid of electrically resistive material that is applied to an exterior upstream surface of the PF and that selectively heats exhaust passing through the grid to initiate combustion of particulates within the PF.

In other features, a method of regenerating a particulate filter (PF) of an exhaust system is provided. The method includes: applying a grid of electrically resistive material to a front exterior surface of the PF; heating the grid by supplying current to the electrically resistive material; inducing combustion of particulates present on the front surface of the PF via the heated grid; and directing heat generated by combustion of the particulates into the PF to induce combustion of particulates within the PF.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 3:
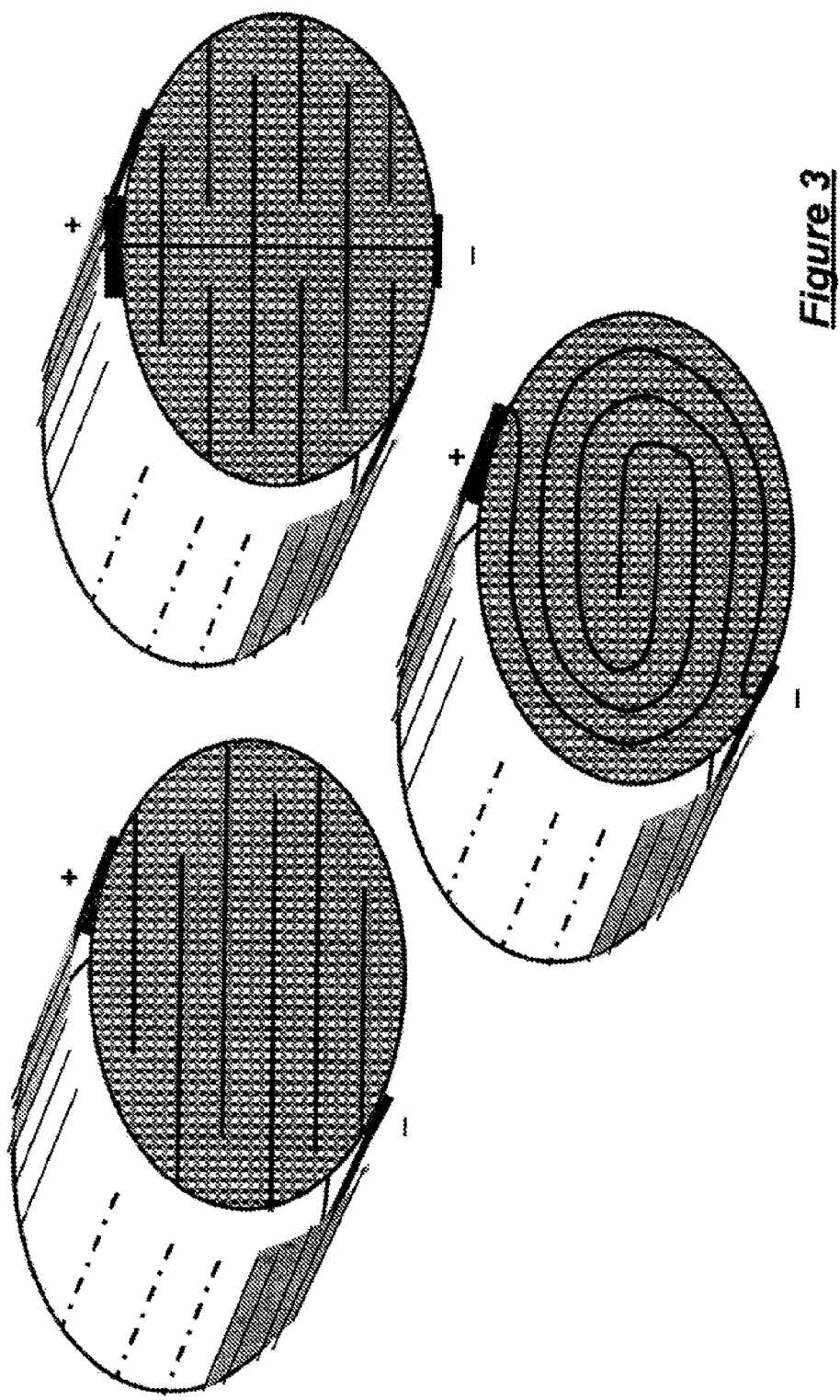

FIG. 3 includes perspective views of front faces of PFs illustrating various patterns of resistive paths.

Figure 4:
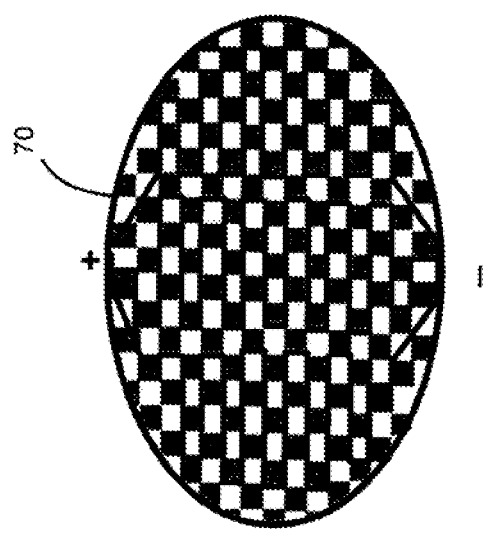
Figure 4:
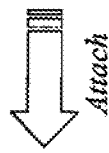
Figure 4:
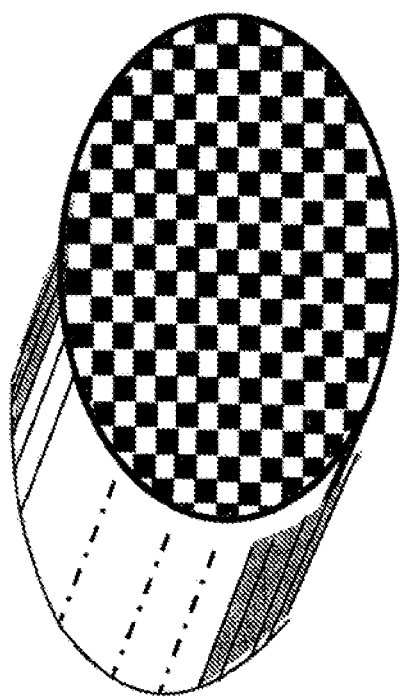

FIG. 4 is a perspective view of a front face of the PF and a heater insert.

Figure 2:
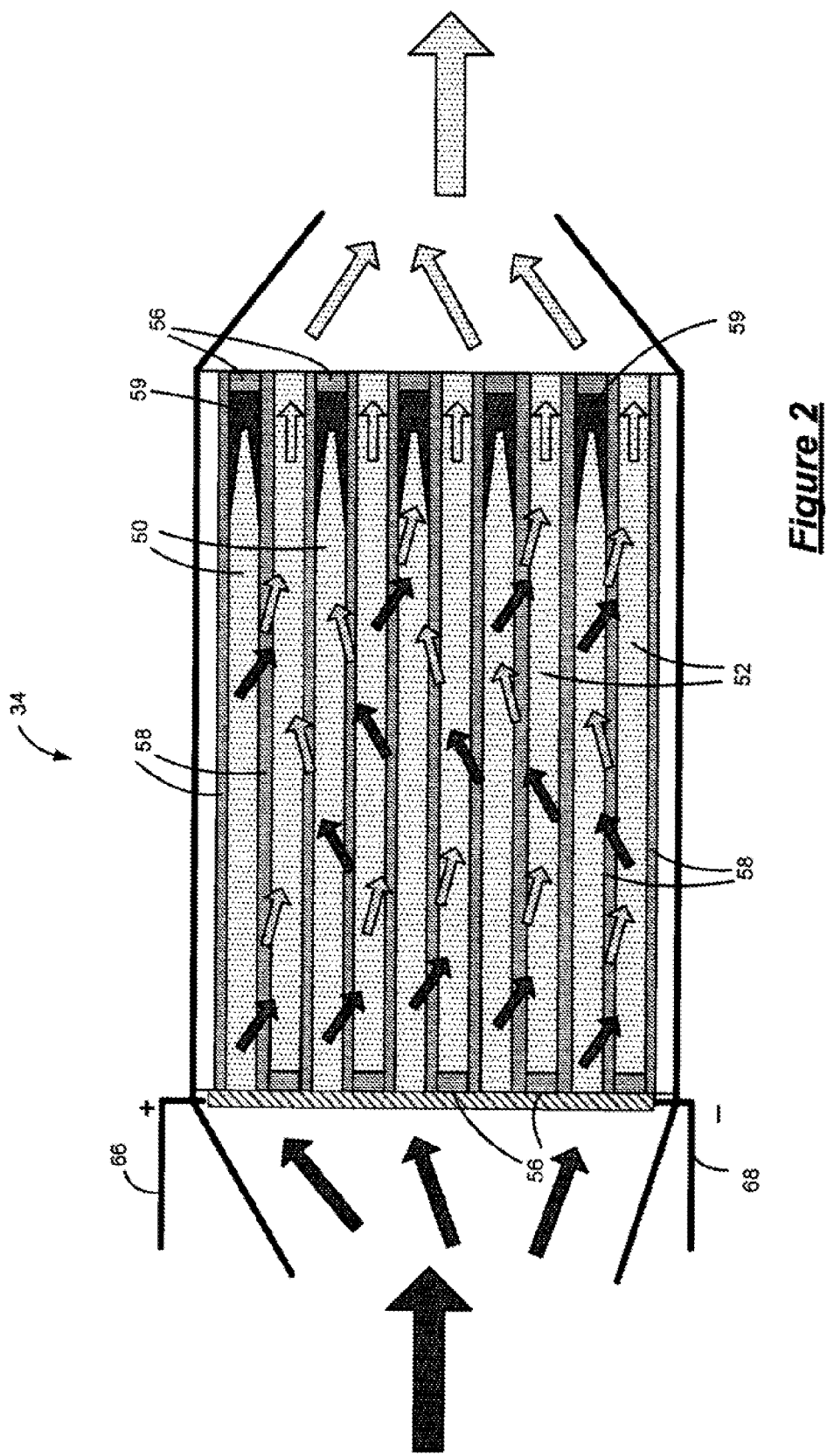
FIG. 2 is a cross-sectional view of a wall-flow monolith particulate filter.
Figure 5:
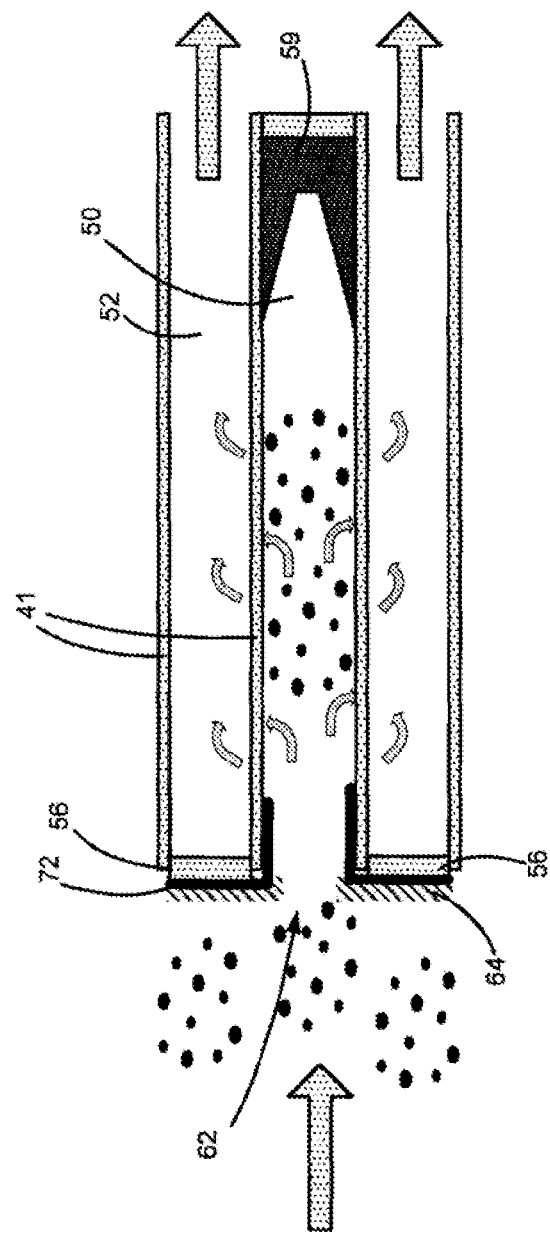

FIG. 5 is a cross-sectional view of a portion of the PF of FIG. 2 including a conductive coating.

DETAILED DESCRIPTION

The following description is merely exemplary in nature and is not intended to limit the present disclosure, application, or uses. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
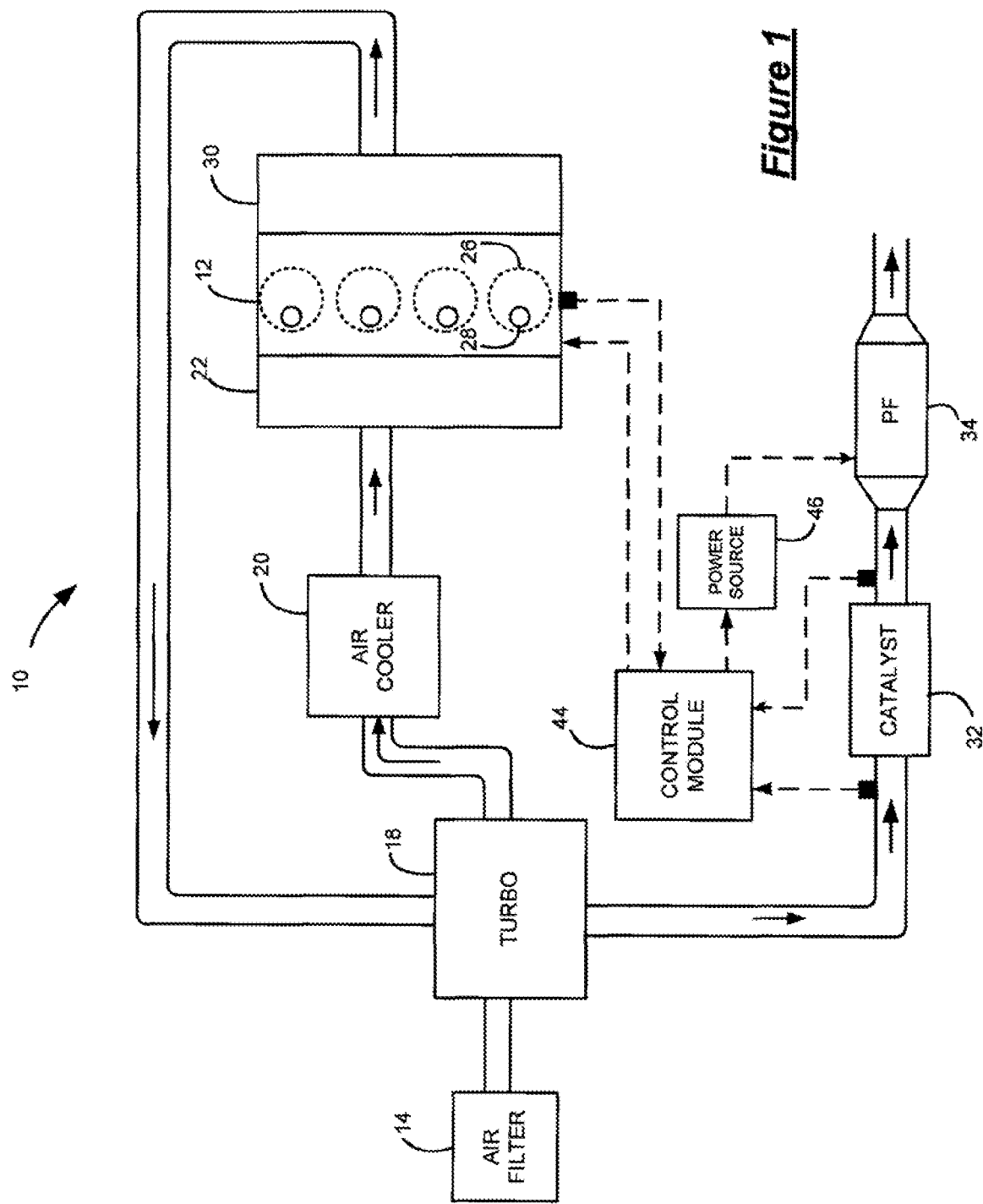
FIG. 1 is a functional block diagram of a vehicle including a particulate filter.

Referring now to FIG. 1, an exemplary diesel engine system 10 is schematically illustrated in accordance with the present invention. It is appreciated that the diesel engine system 10 is merely exemplary in nature and that the particulate filter regeneration system described herein can be implemented in various engine systems implementing a particulate filter. Such engine systems may include, but are not limited to, gasoline direct injection engine systems and homogeneous charge compression ignition engine systems. For ease of the discussion, the disclosure will be discussed in the context of a diesel engine system.

A turbocharged diesel engine system 10 includes an engine 12 that combusts an air and fuel mixture to produce drive torque. Air enters the system by passing through an air filter 14. Air passes through the air filter 14 and is drawn into a turbocharger 18. The turbocharger 18 compresses the fresh air entering the system 10. The greater the compression of the air generally, the greater the output of the engine 12. Compressed air then passes through an air cooler 20 before entering into an intake manifold 22.

Air within the intake manifold 22 is distributed into cylinders 26. Although four cylinders 26 are illustrated, it is appreciated that the systems and methods of the present invention can be implemented in engines having a plurality of cylinders including, but not limited to, 2, 3, 4, 5, 6, 8, 10 and 12 cylinders. It is also appreciated that the systems and methods of the present invention can be implemented in a v-type cylinder configuration. Fuel is injected into the cylinders 26 by fuel injectors 28. Heat from the compressed air ignites the air/fuel mixture. Combustion of the air/fuel mixture creates exhaust. Exhaust exits the cylinders 26 into the exhaust system.

The exhaust system includes an exhaust manifold 30, a diesel oxidation catalyst (DOC) 32, and a particulate filter (PF) 34. Optionally, an EGR valve (not shown) recirculates a portion of the exhaust back into the intake manifold 22. The remainder of the exhaust is directed into the turbocharger 18 to drive a turbine. The turbine facilitates the compression of the fresh air received from the air filter 14. Exhaust flows from the turbocharger 18 through the DOC 32 and the PF 34. The DOC 32 oxidizes the exhaust based on the post combustion air/fuel ratio. The amount of oxidation increases the temperature of the exhaust. The PF 34 receives exhaust from the DOC 32 and filters any soot particulates present in the exhaust.

A control module 44 controls the engine and PF regeneration based on various sensed information. More specifically, the control module 44 estimates loading of the PF 34. When the estimated loading achieves a threshold level (e.g. 5 grams/liter of particulate matter) and the exhaust flow rate is within a desired range, current is controlled to the PF 34 via a power source 46 to initiate the regeneration process. The duration of the regeneration process varies based upon the amount of particulate matter within the PF 34. It is anticipated, that the regeneration process can last between 4-6 minutes. Current is only applied, however, during an initial portion of the regeneration process. More specifically, the electric energy heats the face of the PF for a threshold period (e.g., 1-2 minutes). Exhaust passing through the front face is heated. The remainder of the regeneration process is achieved using the heat generated by combustion of particulate matter present near the heated face of the PF 34 or by the heated exhaust passing through the PF.

With particular reference to FIG. 2, the PF 34 is preferably a monolith particulate trap and includes alternating closed cells/channels 50 and opened cells/channels 52. The cells/channels 50,52 are typically square cross-sections, running axially through the part. Walls 58 of the PF 34 are preferably comprised of a porous ceramic honeycomb wall of cordierite material. It is appreciated that any ceramic comb material is considered within the scope of the present invention. Adjacent channels are alternatively plugged at each end as shown at 56. This forces the diesel aerosol through the porous substrate walls which act as a mechanical filter. Particulate matter is deposited within the closed channels 50 and exhaust exits through the opened channels 52. Soot particles 59 flow into the PF 34 and are trapped therein.

For regeneration purposes, a grid 64 including an electrically resistive material is attached to the front exterior surface referred to as the front face of the PF 34. Current is supplied to the resistive material to generate thermal energy. It is appreciated that thick film heating technology may be used to attach the grid 64 to the PF 34. For example, a heating material such as Silver or Nichrome may be coated then etched or applied with a mask to the front face of the PF 34. In various other embodiments, the grid is composed of electrically resistive material such as stainless steel and attached to the PF using a ceramic adhesive.

It is also appreciated that the resistive material may be applied in various single or multi-path patterns as shown in FIG. 3. Segments of resistive material can be removed to generate the pathways. In various embodiments a perforated heater insert 70 as shown in FIG. 4 may be attached to the front face of the PF 34. In any of the above mentioned embodiments, exhaust passing through the PF 34 carries thermal energy generated at the front face of the PF 34 a short distance down the channels 50,52. The increased thermal energy ignites particulate matter present near the inlet of the PF 34. The heat generated from the combustion of the particulates is then directed through the PF to induce combustion of the remaining particulates within the PF.

With particular reference to FIG. 5, a thermally conductive coating 72 can be additionally applied at the inlets 62 of the channels 50,52. The coating 72 can extend a short distance down the opened ends of the closed channels 50. In various embodiments, the conductive coating extends within an inch of the front face of the PF. The resistive material of the grid 64 contacts the conductive coating 72. Thermal energy is transferred to the conductive coating 72 when electrical energy passes through the resistive material. Heat from the conductive coating 72 ignites particulate matter present near the inlet of the PF 34.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, specification, and the following claims.

What is claimed is:

1. An exhaust system that processes exhaust generated by an engine, comprising:
   a particulate filter (PF) that filters particulates from the exhaust wherein an upstream end of the PF receives exhaust from the engine;
   a grid of electrically resistive material that is applied to an exterior upstream surface of the PF and that selectively heats exhaust passing through the grid to initiate combustion of particulates within the PF; and
   a conductive coating that is applied to the exterior upstream surface of the PF wherein the electrically resistive material of the grid contacts the conductive coating and wherein the electrically resistive material transfers thermal energy to the conductive coating to initiate combustion of particulates on the conductive coating.

2. The exhaust system of claim 1 wherein the grid is stainless steel and wherein the grid is applied to the exterior upstream surface of the PF using a ceramic adhesive.

3. The exhaust system of claim 1 wherein the grid is applied to the exterior upstream surface using thick film heating.

4. The exhaust system of claim 3 wherein the grid is composed of at least one of Silver and Nichrome.

5. The system of claim 1 wherein the grid includes an electrical input and an electrical output and wherein current is passed through the grid via the electrical input and the electrical output.

6. The system of claim 5 further comprising a control module that controls the current supplied to the grid to be during an initial period of a PF regeneration cycle.

7. The system of claim 6 wherein the control module estimates an amount of particulates within the PF and wherein the power is supplied when the amount exceeds a threshold amount.

8. The system of claim 1 wherein the particulate filter is a wall monolith particulate trap that includes a plurality of opened channels and a plurality of closed channels.

9. The system of claim 8 wherein the grid is perforated such that when applied to the PF, openings in the grid match up with the opened channels of the particulate filter.

10. The system of claim 8 wherein the conductive coating is applied to inlets of the plurality of opened and closed channels wherein the conductive coating extends down an upstream portion of the opened channels and wherein the electrically resistive material transfers thermal energy to the conductive coating to initiate combustion of particulates present in the upstream portion of the PF.

11. The system of claim 1 wherein the grid includes pathways of electrically resistive material formed in a single path pattern.

12. The system of claim 1 wherein the grid includes pathways of electrically resistive material formed in a multi-path pattern.

* * * * *